United States Patent [19]
Michishita et al.

[11] 3,734,628
[45] May 22, 1973

[54] METHOD AND APPARATUS FOR DETECTING SURFACE DEFECTS OF MOVING BODIES

[75] Inventors: Katsumi Michishita; Yuji Okami; Tokumatsu Emura, all of Kawasaki-shi, Kanagawa-ken, Japan

[73] Assignee: Nippon Kokan Kabushiki Kaisha, Tokyo, Japan

[22] Filed: Nov. 12, 1971

[21] Appl. No.: 198,317

[52] U.S. Cl. ............356/200, 250/219 DF, 356/120, 356/209, 356/237
[51] Int. Cl. ...................G01n 21/16, G01n 21/32
[58] Field of Search ...............250/219 DF; 356/120, 356/256, 200, 209, 212, 161, 61; 350/61

[56] References Cited

UNITED STATES PATENTS

| | | | |
|---|---|---|---|
| 3,427,109 | 2/1969 | Beattie et al. | 350/219 DF |
| 2,930,893 | 3/1960 | Carpenter et al. | 356/102 |
| 3,185,024 | 5/1965 | McCreanor | 356/161 |

*Primary Examiner*—Ronald L. Wibert
*Assistant Examiner*—J. P. McGraw
*Attorney*—Robert D. Flynn, Stephen H. Frishauf, Leonard Holtz et al.

[57] ABSTRACT

In a method of detecting a surface defect of a moving body deposited with non-uniformly distributed oil films wherein the surface of the moving body is scanned with light, the light reflected by the surface is converted into an electrical signal, and the electrical signal exceeding a predetermined level is derived out as a defect signal the improvement wherein, a scanning light of a wavelength having a high transmissibility for the oil film is formed, a uniform film of the oil is applied on the surface of the moving body, and the surface coated with the uniform thickness of oil film is scanned with the high transmissibility scanning light.

9 Claims, 3 Drawing Figures

3,734,628

METHOD AND APPARATUS FOR DETECTING SURFACE DEFECTS OF MOVING BODIES

BACKGROUND OF THE INVENTION

This invention relates to a method and apparatus for detecting surface defects of a moving body, and more particularly to a method and apparatus for detecting surface defects of a moving body at high accuracies and efficiencies without being affected by non-uniformly deposited films of oil such as skin pass oil or rust preventing oil and the like.

In a well known method and apparatus for detecting surface defects of a moving body such as a cold rolled strip, the surface defects are detected by means of a photoelectric converter for producing defect signals. The history of such method and apparatus for detecting surface defects is relatively short. Although the method and apparatus presently available can detect large defects but can not efficiently detect small defects when the surface of the moving body is non-uniformly covered by an oil film.

More particularly, when the surface of the moving body is non-uniformly coated by an oil film such as skin pass oil or the like and when such film has a characteristic to absorb the light used to detect the surface defects, it will produce a large electric signal causing miss-operation of the detecting apparatus. Thus, for example, temper rolling oil has a large absorption in the wavelength range of the light utilized to scan the moving body, as shown in FIG. 1. For this reason, when the temper rolling oil is distributed non-uniformly on the surface of the moving body, its non-uniform absorption of the light results in a large variation of the light reflected by the moving body and such large variation causes the detecting apparatus to misjudge it as a surface defect.

To overcome this difficulty, it may be possible to provide a device for detecting a non-uniformly distributed oil film which is so interlocked with the apparatus for detecting the surface defect as to cancel the output from the defect detecting apparatus. With this arrangement, however, due to the difference between the detectable pattern of the oil film (size and degree of non-uniformity) and the detectable size of the surface defect it is impossible for the defect detector to accurately detect a surface defect smaller than a predetermined limit.

SUMMARY OF THE INVENTION

It is an object of this invention to provide a novel method and apparatus for detecting at high accuracies and efficiency the surface defects of a moving body without being affected by the presence of non-uniformly distributed oil film such as skin pass oil or rust preventing oil deposited on the surface thereof.

In accordance with one aspect of this invention, there is provided a method of detecting a surface defect of a moving body of the type wherein the surface of a moving body deposited with non-uniformly distributed oil film is scanned with light, the light reflected by the surface is converted into an electrical signal, and the electrical signal exceeding a predetermined level is derived out as a defect signal, characterized in that a scanning light of a wavelength having a half transmissibility for the oil film is formed, that a uniform film of the oil is applied on the surface of the moving body, and that the surface coated with the uniform oil film is scanned with the scanning light.

According to another aspect of the invention there is provided an apparatus for detecting a surface defect of a moving body deposited with non-uniformly distributed oil films such as skin pass oil or the rust preventing oil wherein the surface of the moving body is scanned with light, the light reflected by the surface is converted into an electrical signal, characterized in that there are provided means for producing scanning light of a wavelength having a high transmissibility for the oil film, means for applying a uniform film of the oil on the entire surface of the moving body, means for scanning the surface coated with the uniform oil film with the scanning light, and a photoelectric converter disposed to receive the scanning light reflected by the surface for producing an electrical signal representing a surface defect.

DESCRIPTION OF THE PREFERRED EMBODIMENT

Figure 2:
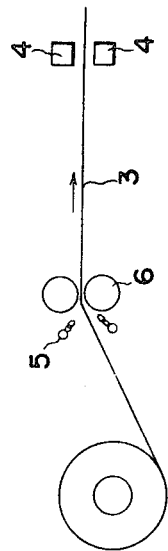
FIG. 2 is a block diagram of one example of the apparatus for detecting surface defects embodying the invention.

With reference first to FIG. 2 of the accompanying drawing, the light emitted from a light source 1 is reflected by a rotary mirror 2 so as to cause it to scan a moving metal strip 3 in the transverse direction. The light reflected by the surface of the metal strip is converted into an electrical signal by means of a photoelectric converter 4.

Figure 1:
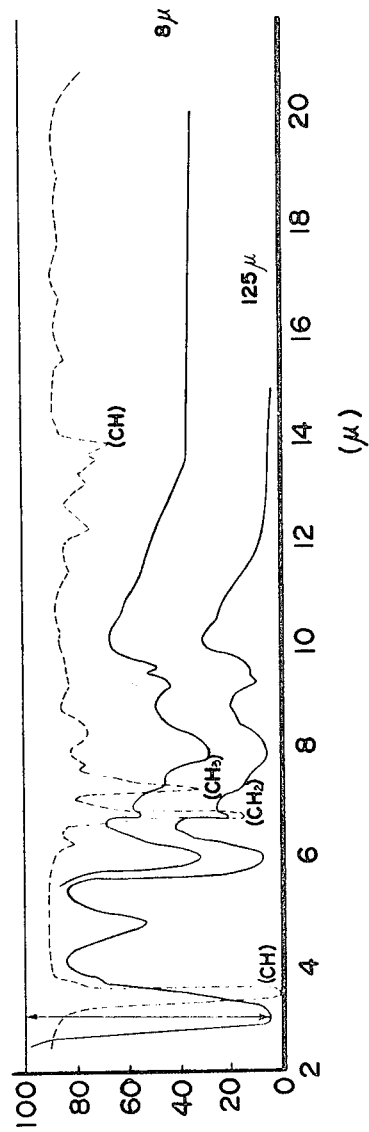
FIG. 1 is a graph illustrating the percentage transmission of light of various oils coated on the surface of cold rolled steel strips.
Figure 3:
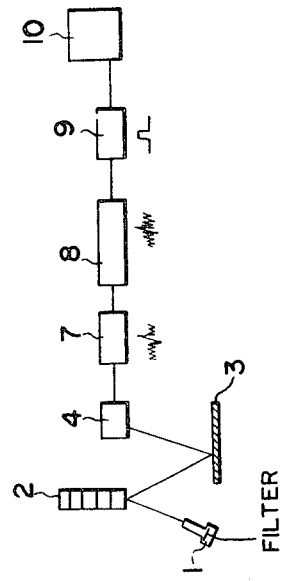
FIG. 3 is a diagrammatic representation of the apparatus for applying a uniform oil film on the surface of a metal strip.

The light source 1 is selected to emit light of the wavelength that can transmit through the oil film applied on the surface of the metal strip 3. Alternatively a suitable screen may be used. Where rust preventing oil is applied on the strip surface, the wavelength of the light source is selected within the near infrared region of 4 to 6 $\mu$ which has a high percentage transmission for the rust preventing oil (see FIG. 1) and an infrared ray detecting element, made of PbS, for example, is used as the light receiving element of the photoelectric converter. Further, in accordance with this invention, oil spray nozzles 5 or oil squeeze rollers 6 are used to uniformly coat thin oil films on the entire surface of the metal strip 3, as diagrammatically shown in FIG. 3. Oil films of uniform thickness applied in this manner prevent any variation in the reflected light which may be caused by a non-uniform oil film. Accordingly, the ground noise can be reduced greater so that the accuracy of the surface defect detection can be improved thus enabling detection of small surface defects. The light source 1 may include a filter for providing the desired light wavelengths.

The electrical signal generated by the photoelectric converter 4 is amplified by an amplifier 7 and is then sent to a discriminator 8 which acts to determine a signal higher than a predetermined level as a defect signal and to determine a signal lower than the predetermined level as a noise signal, thus discriminating and separating the defect signal from the noise signal. In the case of the defect signal, a pulse is generated which is amplified by a relaying amplifier 9 and is then supplied is a suitable defect display device such as a buzzer, a lamp or a recording instrument.

Thus, in accordance with this invention since an oil film is uniformly applied onto the surface of a moving body being examined and since the surface is scanned with light of a wavelength having a high transmissibility for the oil film, the scanning light is reflected essentially by the surface being examined thus eliminating the ground noise caused by a non-uniform oil film. For this reason, it is possible to accurately detect even small defects which could not be detected due to the ground noise caused by the non-uniform oil films.

Although the invention has been shown and described in terms of a preferred embodiment it should be understood that the invention is by no means limited to this specific embodiment and that many changes and modifications will be obvious to one skilled in the art without departing from the true spirit and scope of the invention as defined in the appended claims.

What is claimed is:

1. In a method of detecting a surface defect of a moving body wherein the surface of a moving body deposited with non-uniformly distributed oil films such as skin pass oil or rust preventing oil is scanned with light, the light reflected by said surface is converted into an electrical signal, and the electrical signal exceeding a predetermined level is derived out as a defect signal, the improvement which comprises the steps of producing a scanning light within a predetermined range of wavelengths having a high transmissibility for said oil film, applying a uniform film of said oil on the surface of said moving body, and scanning said surface coated with said uniform film of oil with said scanning light.

2. The method according to claim 1 comprising detecting a surface defect of a metal strip.

3. The method according to claim 1 comprising passing a light through a filter to produce said scanning light.

4. The method according to claim 1 comprising producing a scanning light having a wavelength within the range of 4 to 6$\mu$.

5. In an apparatus for detecting a surface defect of a moving body deposited with non-uniformly distributed oil films such as skin pass oil or rust preventing oil wherein a said surface is scanned with light, the light reflected by said surface is converted into an electrical signal, the improvement which comprises means for producing a scanning light within a predetermined range of wavelengths having a high transmissibility for said oil film, means for applying a uniform film of said oil on the entire surface of said moving body, means for scanning said surface coated with said uniform oil film with said scanning light, and a photoelectric converter disposed to receive said scanning light reflected by said scanned coated surface for producing an electrical signal representing the condition of the surface of said moving body.

6. The apparatus according to claim 5 wherein said means for producing said scanning light comprises a light source and a filter.

7. The apparatus according to claim 5 wherein said means for applying said oil film comprises a squeeze roller.

8. The apparatus according to claim 5 wherein said means for applying said oil film comprises oil spray nozzles.

9. The apparatus according to claim 5 wherein said means for producing a scanning light produces a scanning light having a wavelength within the range of 4 to 6$\mu$.

* * * * *